Nov. 29, 1966  O'DELL KEIL  3,288,442
POTATO WHIPPING MACHINE
Filed July 22, 1965  7 Sheets-Sheet 1

INVENTOR:
O'DELL KEIL
BY
Dawson, Tilton, Fallon, Lungmus & Alexander
ATT'YS

Nov. 29, 1966   O'DELL KEIL   3,288,442
POTATO WHIPPING MACHINE
Filed July 22, 1965   7 Sheets-Sheet 2
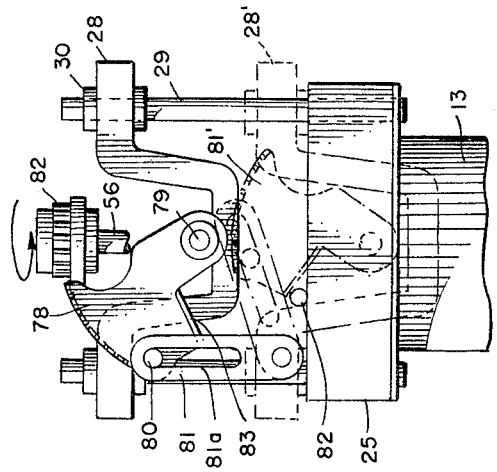
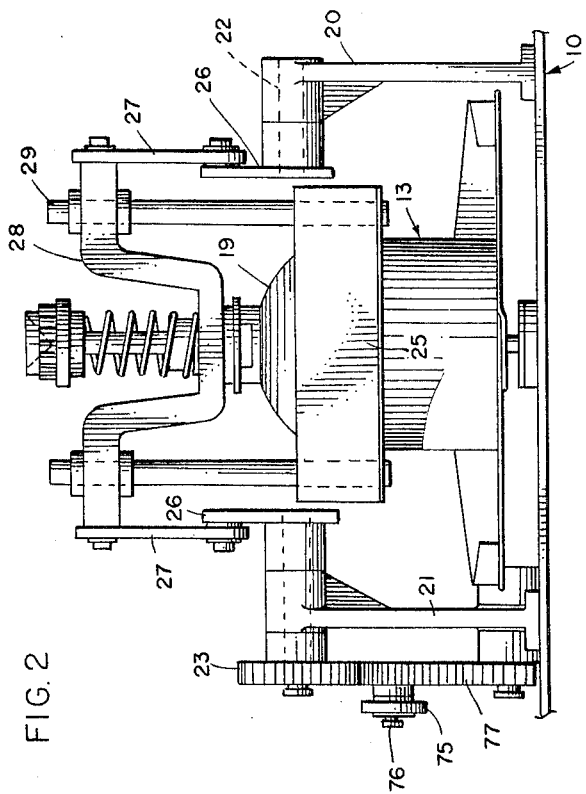
INVENTOR:
O'DELL KEIL
BY
Dawson, Tilton, Fallon, Lungmus & Alexander
ATT'YS

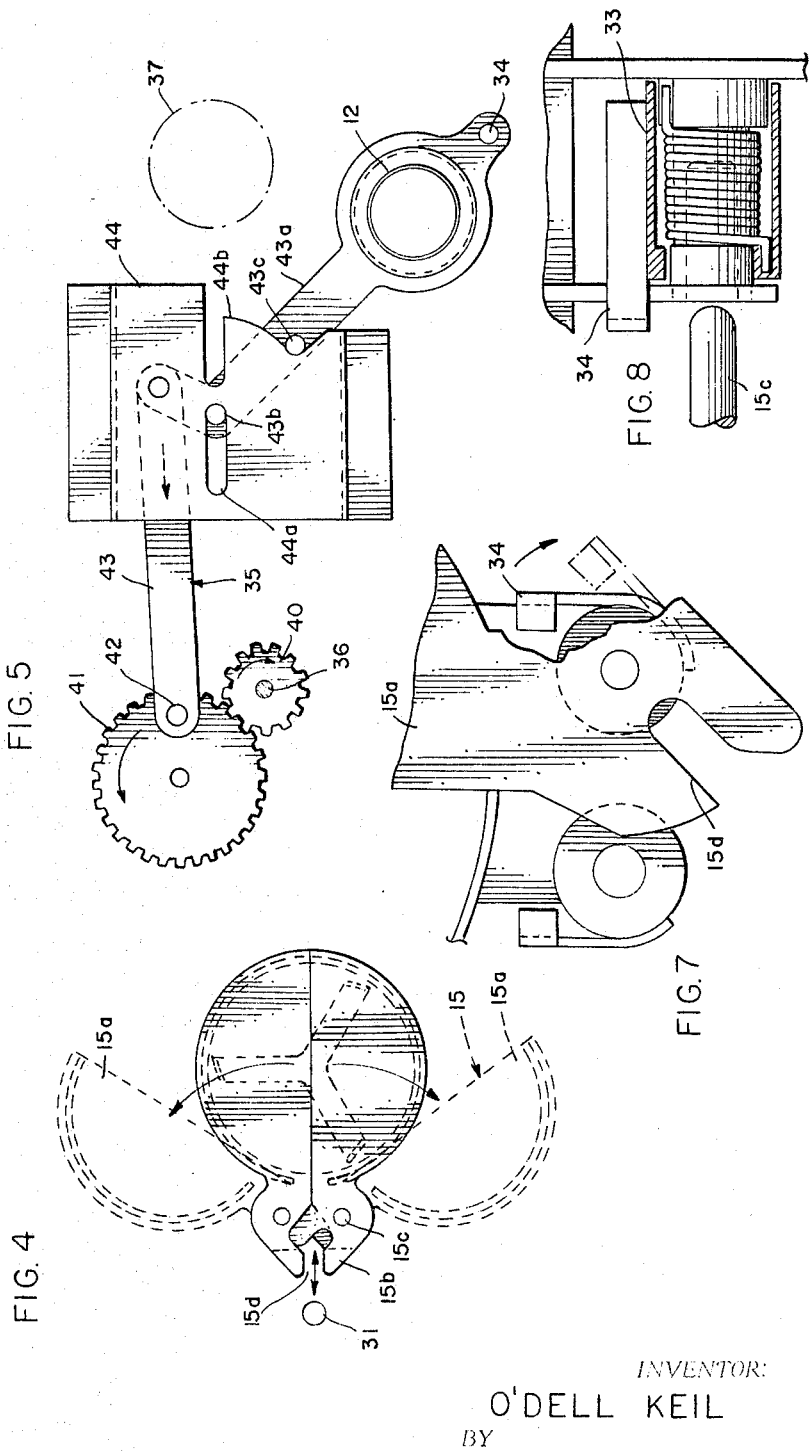

Nov. 29, 1966 — O'DELL KEIL — 3,288,442
POTATO WHIPPING MACHINE
Filed July 22, 1965 — 7 Sheets-Sheet 5

INVENTOR:
O'DELL KEIL
BY
Dawson, Tilton, Fallon, Lungmus & Alexander
ATT'YS

Nov. 29, 1966  O'DELL KEIL  3,288,442
POTATO WHIPPING MACHINE
Filed July 22, 1965  7 Sheets-Sheet 6

INVENTOR:
O'DELL KEIL
BY
Dawson, Tilton, Fallon, Lungmus & Alexander
ATT'YS

Nov. 29, 1966  O'DELL KEIL  3,288,442
POTATO WHIPPING MACHINE
Filed July 22, 1965  7 Sheets-Sheet 7

INVENTOR:
O'DELL KEIL
BY
Dawson, Tilton, Fallon, Lungmus & Alexander
ATT'YS

United States Patent Office 3,288,442
Patented Nov. 29, 1966

3,288,442
POTATO WHIPPING MACHINE
O'Dell Keil, Phoenix, Ariz., assignor to Automatic Marketing Industries, Inc., Phoenix, Ariz., a corporation of Arizona
Filed July 22, 1965, Ser. No. 473,944
11 Claims. (Cl. 259—8)

This invention relates to a potato whipping machine, and, more particularly, to a novel machine adapted to receive dehydrated potato flakes, whip the same when diluted with water and thereafter dispense whipped potatoes in conventional scoop form.

Although potatoes are a staple on most restaurant menus, particularly mashed potatoes, difficulties have arisen in providing the mashed potatoes in a fresh form, particularly during off-hours. This is especially the case with small restaurants, roadside diners, etc. One of the staple items provided by such eating places is mashed potatoes and the trade has come to expect these to be dispensed in a mound form—as from an ice cream scoop device. To do this mechanically, automatically, and upon instant notice is a problem facing the art which has not been solved. The instant invention makes this possible and further, whips and dispenses single serving quantities sequentially. The provision of such an apparatus constitutes an important object of the invention. Another object of the invention is to provide a unique apparatus for whipping potatoes and one that is advantageously compact for installation in small restaurants, particularly where space is at a premium, yet wherein the compactness does not derogate from reliability.

Other objects and advantages may be seen in the details of the construction and operation set down in this specification.

The invention is explained in conjunction with an illustrative embodiment in the accompanying drawing, in which:

FIG. 2 is a fragmentary and elevational view as viewed from the right end portion of FIG. 1 and with the whipping chamber shown in a position corresponding to the dotted line position of FIG. 1;

FIG. 3 is a fragmentary and elevational view of the whipping chamber portion of FIG. 2, but looking at the same from the left hand side of FIG. 1;

FIG. 4 is a top plan view of the whipping chamber seen in the preceding views;

FIG. 5 is a detailed drawing of the drive connections associated with FIG. 1;

FIG. 7 is a fragmentary top plan view of the whipping chamber lid, enlarged from the dotted line showing in FIG. 4;

FIG. 8 is a vertical sectional view of the lid mounting portion of the whipping chamber;

Figure 1:
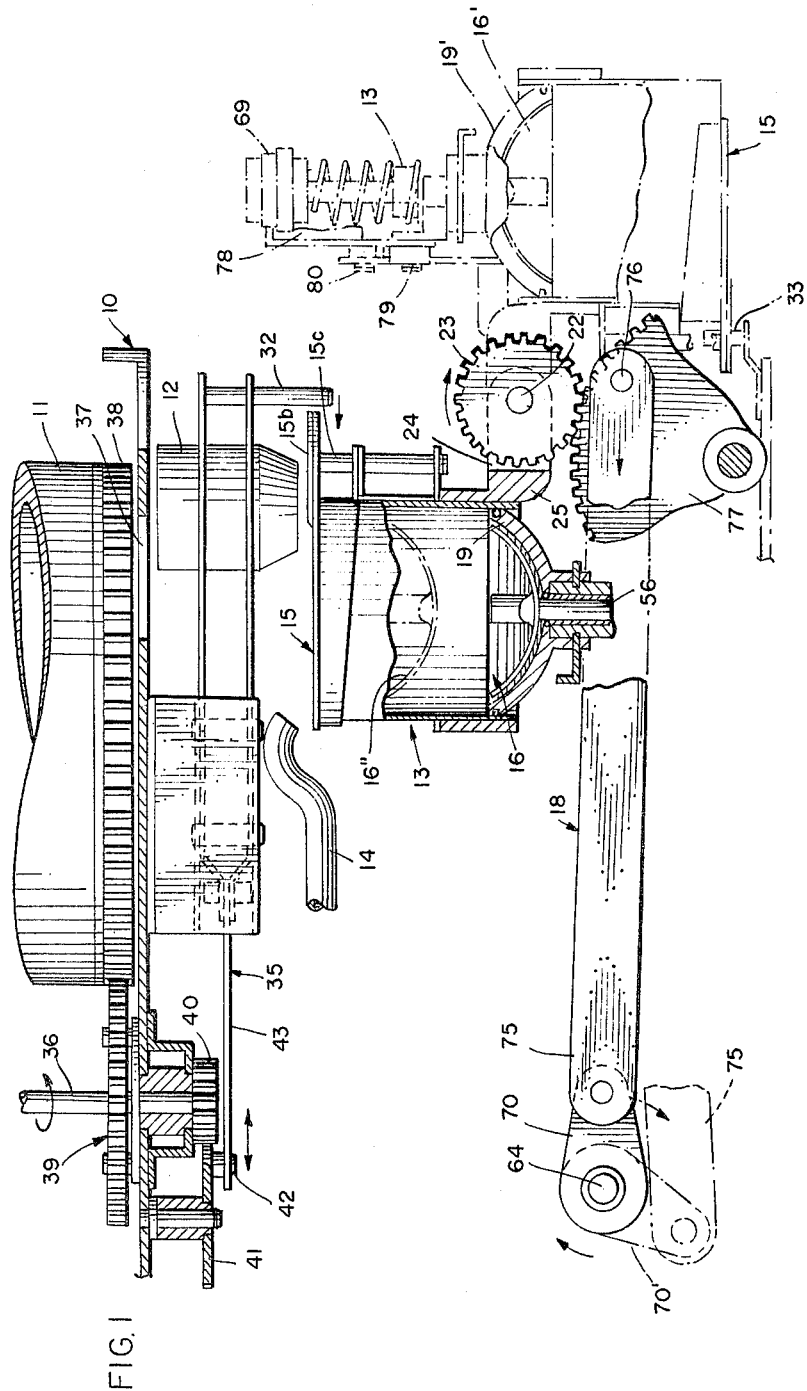
FIG. 1 is a fragmentary elevational view partially in section of apparatus constructed according to teachings of the invention.

In the illustration given and with particular reference to FIG. 1, the numeral 10 designates generally a portion of a frame which is of considerable scope and weight so as to support the remaining components seen in FIG. 1. However, the bulk of the frame has been omitted for the sake of clarity, it being appreciated that a box-like enclosure may be provided as part of the frame.

Before going to a detailed description of the various mechanical parts of the apparatus, it is believed that the generalized description of the over-all operation will be helpful in understanding the invention and, for that purpose, the following is set down.

*General operation*

The frame 10 supports a hopper 11 which is adapted to receive dehydrated potato chips. These chips can be dispensed sequentially through a dispensing spout 12 into a whipping chamber generally designated 13. Water from another spout 14 is also delivered to the whipping chamber 13. A closure 15 (seen also in FIG. 4) is provided for the whipping chamber.

Once the ingredients of the mashed potatoes are introduced into whipping chamber 13, an impeller generally designated 16 is activated by means of a drive member 17. This agitates the liquid and dry ingredients to form mashed or whipped potatoes. Thereafter, the whipping is stopped and the whipping chamber 13 is rotated through a 180° arc to the dotted line position designated 13' in FIG. 1 by a drive and linkage mechanism generally designated 18. In the dispense position, the reference numerals are equipped with a prime ('). Thereafter, the mechanism is operative to cause the cup-shaped bottom portion 19' of the whipping chamber 13' to move downwardly while the impeller 16' turns at a much slower rate so as to expel the mashed potatoes. Thus, the conventionally desired mold or scoop shape of mashed potato is provided and in a quantity adapted for a single serving.

The mechanical details which make the foregoing generalized operation possible will now be described.

*Whipping chamber support*

Referring to FIG. 2, the frame is again designated 10 and it will be seen that upstanding from the frame 10 are a pair of pedestals 20 and 21. Journalled in the pedestals 20 and 21 is a cross-shaft 22 which at one end has a gear 23 affixed thereto. It wil lbe appreciated that the rotation of the gear 23 is achieved through the mechanism 18 previously referred to.

Frictionally mounted on the shaft 22 are arms 24 (seen only in FIG. 1) which constitute part of a bracket 25 for supporting the whipping chamber 13. Thus, as the gear 23 is rotated, the whipping chamber 13 rotates therewith from the solid line configuration to the dotted line configuration 13' (see FIG. 1).

Now referring to FIG. 2, the numerals 26 and 27 designate two pairs of interconnected links which extend between the shaft 22 and a yoke 28 mounted on posts 29 provided as part of the bracket 25. The yoke 28 is fixed to the cup-shaped bottom 19 of the whipping chamber so that actuation of the pivot links 26 and 27 at the end of a whipping cycle is effective to move the cup-shaped bottom 19 downwardly to eject a quantity of whipped potatoes.

For this purpose, the yoke 28 is equipped with sleeves 30 (see FIG. 3) which are in sliding relationship with the posts 29. Still referring to FIG. 3, it will be seen that the lower position of the yoke 28 is shown in dotted line and designated 28', this corresponding to the dotted line showing of the whipping chamber 13' as seen in FIG. 1.

*Whipping chamber cover*

As mentioned previously, the cover 15 of the whipping chamber is opened at the beginning and end of each cycle. At the beginning, this is for the purpose of charging the ingredients while at the end, the opening of the cover 15 (see FIG. 4) is for the purpose of discharging the whipped potatoes. In FIG. 4, it will be seen that the split cover 15 has each portion 15a thereof equipped with an arm portion 15b carrying a depending post 15c. The arm portions 15b are arranged to define a slot 15d. At the end of a cycle, the arcuate movement of the whipping chamber 13, hence the cover 15, is such as to position a stationary actuator post 31 within the slot 15d and pivot the cover portions 15a to the dotted line positions indicated in FIG. 4. The actuator post 31 is provided on a stationary part of the frame as can be appreciated from a consideartion of FIG. 1 (in the lower right hand corner thereof). Likewise, at the beginning of a cycle, the cover portions 15a are open and for this purpose the apparatus is equipped with a depending actuator post 32 (see the upper central portion of FIG. 1).

Reference to FIGS. 7 and 8 reveals that the pin 15c is mounted within a torsion spring bracket 33 equipped with an arm 34. The lids 15a are held in the closed position by the torsion spring bracket 33 provided on each lid hinge pin 15c. The spring is enclosed in the cylinder which is equipped with the arm 34. The arm or hook 34 is also used for removal of the lids 15a. To remove the lid 15a, pressure is applied to the hook 34 disengaging it from the lid hinge. Thereafter, the lid is lifted off. To replace the lid, the lid hinge pin is inserted into the hole on the spring stud and set into place by pivoting the spring hook away from the hinge until the lid is in place. The hinge hook when released now holds the lid 15a in place.

*Details of filling apparatus*

For filling or charging the whipping chamber 13 with ingredients, the cover 15 must be open and for this purpose, the previously mentioned actuator post 32 is provided. Unlike the post 31, this is movably mounted so as to move into engagement with the arms 15b and thereby open the cover 15 at an appropriate time. The actuator post 32 is associated with a linkage mechanism generally designated 35 (see FIGS. 1 and 5) which mechanism is associated with the hopper 11 and spout 12.

Figure 9:
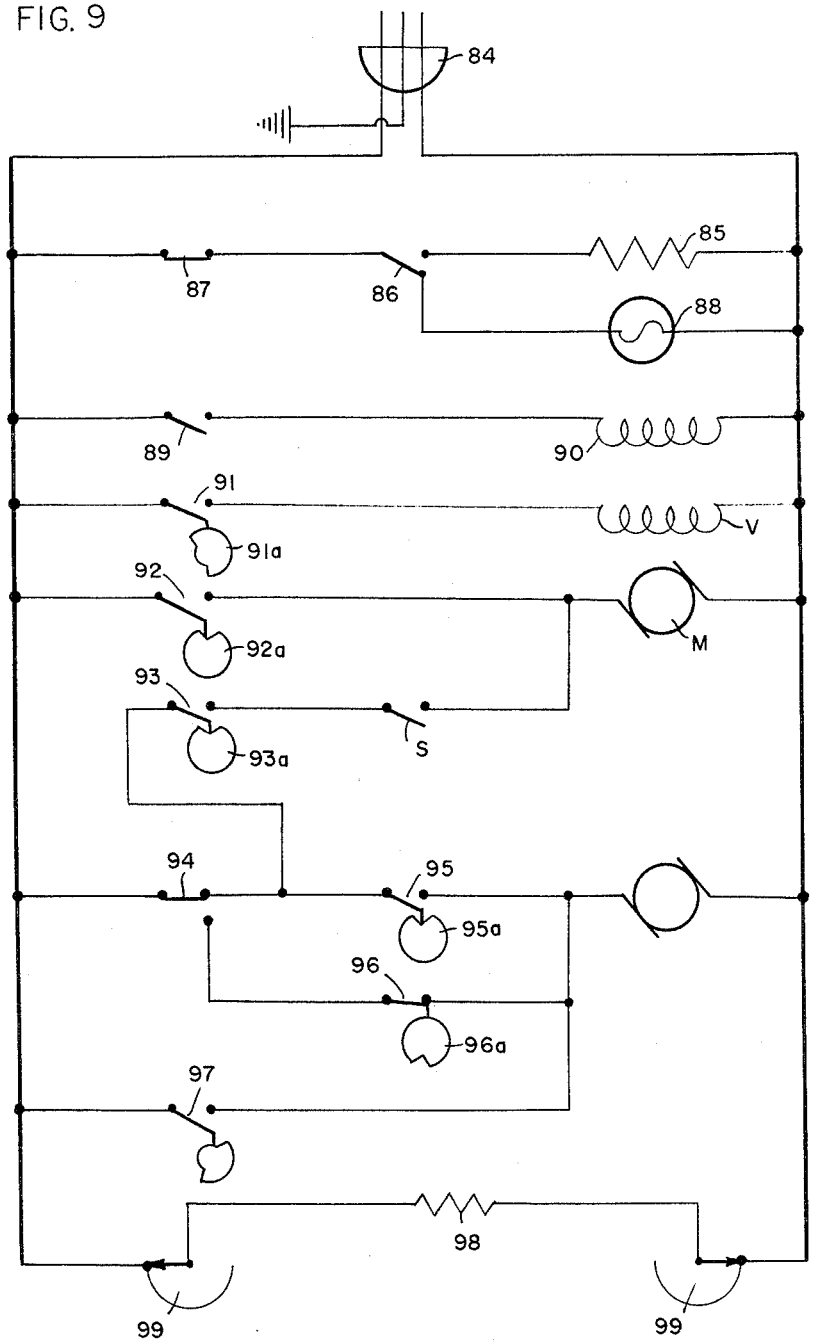
FIG. 9 is a schematic diagram of the wiring and electromechanical elements employed in the operation of the machine.

The mechanism 35 is that which is first responsive to the actuation of a start button S (see FIG. 9). The start button 35a actuates an electric motor M which delivers rotational power to a drive shaft 36 (see the upper left hand portion of FIG. 1) supported within a portion of the frame 10. The frame portion 10 is equipped with an opening 37 positioned below the hopper 11 so as to permit passage of a charge of flaked potatoes. The charge is contained within a cavity inside the hopper 11 and cavities are sequentially brought into position over the opening 37 by means of rotating the hopper 11. For this purpose, the hopper 11 is equipped with a spur gear 38 driven by means of a coacting gear 39 fixed to the shaft 36. A second gear 40 (still referring to FIG. 1 in the upper left hand corner thereof) fixed to the shaft 36 engages a gear 41 rotatably mounted on the frame 10. The gear 41 in turn carries an eccentric pivot post 42 constituting part of the linkage mechanism 35.

On actuation of the appartus, the hopper motor M is impulsed and by the gear mechanism 39, 38, the hopper is rotated 70°. A connecting rod 43 (see FIGS. 1 and 5) coupled to the gear mechanism 40, 41 moves the hopper funnel 12 toward a position in alignment with the opening 37 (see FIG. 5). During this movement, the actuating post 32 is first brought into engagement with the arms 15b. When the cover portions 15a are approximately one-third open, i.e., moved one-third of their whole movement, hot water is caused to flow through the conduit 14 by means of a solenoid valve V.

Thereafter, the linkage mechanism 35 continues its movement under the influence of the drive shaft 36 until the cover portions 15a are completely open. At this time a positive displacement cavity in the hopper 11 discharges a predetermined volume of dry ingredients into the whipping chamber 13, while water is still flowing and blending with the ingredients.

The continued rotation of the drive shaft 36 is accompanied by corresponding movement of the connecting rod 43 so as to remove the funnel 12 from its position of alignment with the cavity 37 and further, to remove the actuator post 32 from engagement with the arms 15b. This causes the cover portions or lids 15a to close tightly and the electrical system is arranged so that at the time the lids 15a are two-thirds closed, the water cycle discontinues.

Reference to FIG. 5 reveals that the connecting rod 43 is pivotally connected on a bracket portion 44 of the frame and is equipped with an L-shaped extension 43a carrying the funnel 12 and actuator post 32. The travel of the extension of 43a is governed by posts 43b and 43c (still referring to FIG. 5) which ride in a slot 44a and against an arcuate track portion 44b, respectively.

At this instant of time in the cycle, the drive shaft 36 ceases to rotate and the whipping portion of the cycle is commenced.

Figure 11:
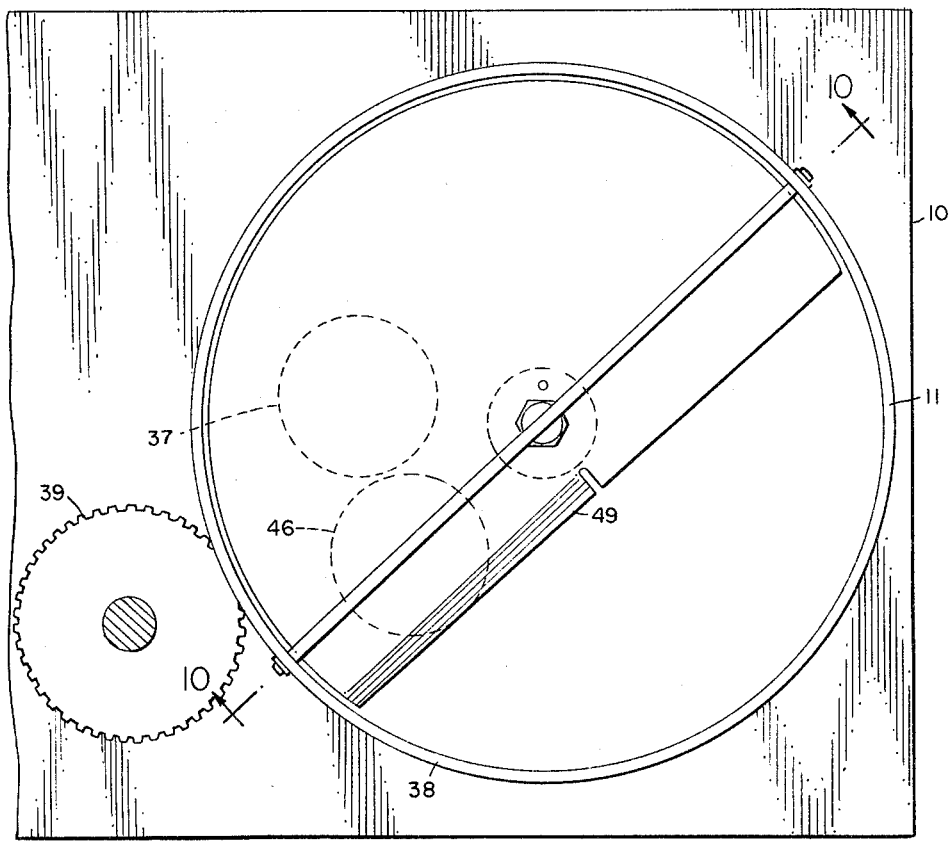
FIG. 11 is a sectional view taken along line 11—11 of FIG. 10.
Figure 10:
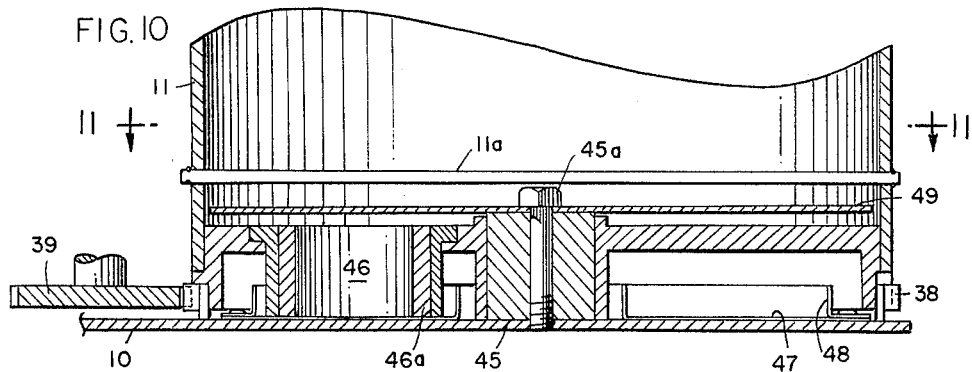
FIG. 10 is a fragmentary sectional view of the hopper portion of the machine taken along line 10—10 of FIG. 11.

The interior details of the hopper assembly can be seen in FIGS. 10 and 11. The hopper 11 includes a tubular portion integral with the ring gear 38 (see FIG. 10) and which is mounted on a hub 45. The gear is equipped with a through cavity 46 which is adapted to register with the cavity or passage 37 (see FIG. 11). Mounted on the stationary base 10 are trough rings 47 and 48 (see FIG. 10) and further, a metering plate 49 is stationarily mounted on the base 10. Thus, the stationary parts of the base 10, trough rings 47, 48, the hub 45 and the meter plate 49. The other parts rotate when the large gear 38 is driven by the smaller gear 39. The base 10, hub 45 and meter plate 49 are rigidly held together by a bolt 45a. One revolution of the large gear disc 38 occurs for each serving and during this, the trough rings 47, 48 prevent fine powder from sifting downwardly and outwardly. The small rod 11a extending through the tube or hopper 11 agitates the powder, so that the cavity 46 in the gear 38 fulfilled uniformly for each revolution. Also, the rod 11a sweeps the powder off the meter plate 49 as the powder quantity diminishes. The meter plate 49 prevents additional unmetered amounts of powder from dropping through the cavity 46 as it passes over the cavity 37 in the base and trough rings 47, 48. The volume of the cavity can be readily altered by changing the diameter of the insert 46a defining the same.

*Whipping Mechanism*

Figure 12:
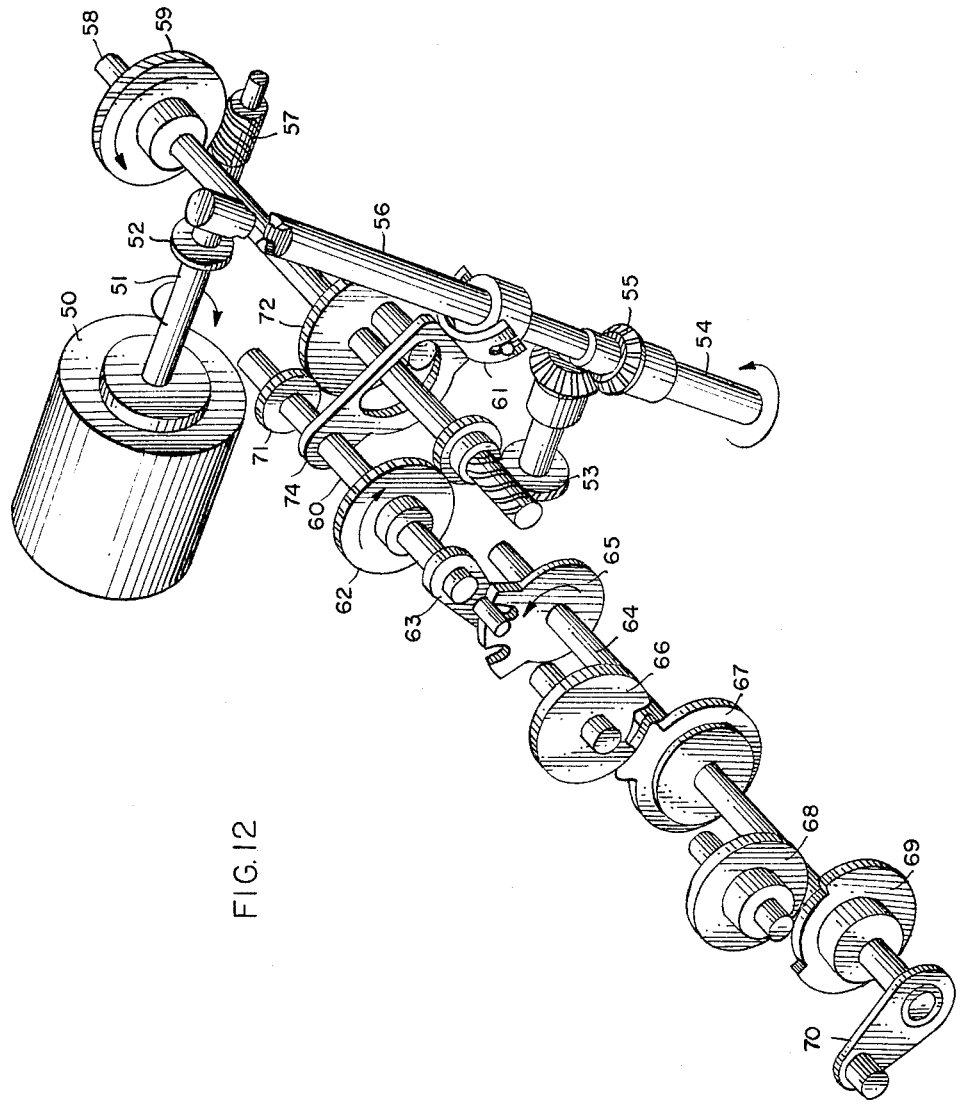
FIG. 12 is an exploded perspective fragmentary view of the drive train and gearing employed in the machine.

The Vend motor 50 (see FIG. 12) when energized turns its shaft 51 and drives a spur gear 52. The spur gear 52 in turn is meshed with a spur gear 53 ( for clearness of illustration, shown spaced apart), which in turn rotates shaft 54 by means of miter gears 55. The shaft 54 is carried on the frame 10 and is internally splined (not shown) relative to shaft 56 to permit shaft 56 to slide vertically within the shaft 54. The shaft 56 can be seen in the central lower portion of FIG. 1 and is responsible for turning the impeller 16.

The Vend motor 50 also drives a worm 57 which in turn rotates shaft 58 by means of a worm gear 59. The shaft 60 (still referring to FIG. 12) is then rotated through spur gears 61 and 62 carried respectively by shafts 58 and 60. Shaft 60 rotates a crank 63 which in turn rotates a shaft 64 by means of a Geneva cam 65.

The shaft 60 makes two revolutions for each revolution of shaft 64. This is accomplished by means of the Geneva drive including the crank 63, the shaft 64, the Geneva locking cams 66 and 67 and the spur gears 68 and 69. The spur gear 69 is notched to allow gear 68 to revolve and not be enmeshed with gear 69 when shaft 64 is idle.

Coupled to the shaft 60 is the crank arm 70 which is connected by means of the connecting link 18 to pivot the whipping chamber from the fill position to the dispensing position.

The shaft 60 also drives gear 71 which in turn drives gear 72, the gear 72 being free to rotate around shaft 58. The gear 72 drives a cam yoke 74 which is pivoted on shaft 60, raising and lowering shaft 56. Shaft 56 as pointed out previously is the whipping drive shaft which drives the impeller 16. This shaft 56, when raised, engages shaft 56. This develops a direct coupled drive.

When the Vend motor 50 is energized, shaft 60 is rotated and by means of the Geneva movement makes one complete revolution while shaft 64 is idle. During the first revolution, the shaft 60, the whipping drive shaft 56 is rotated and caused to raise and lower itself through the cam yoke 74. At the end of this revolution, the whipping drive shaft 56 is then lowered and by means of gear 69 now coming into mesh with gear 68, shaft 70 makes one revolution driving the whipping chamber to the dispensing position and returning it to its "rest" or "fill" position.

The movement of the whipping chamber 13 is achieved through the linkage mechanism 18 as follows:

Whipping Chamber Rotation Mechanism

For the purpose of rotating the whipping chamber 13, the drive shaft 64 is actuated following complete retraction of the shaft 56. The shaft 64 has the crank arm 70 fixed thereto which in turn is pivotally connected to a connecting rod 75 (see the central left hand portion of FIG. 1). Rotation of the shaft 64 brings the crank 70 to the position 70′ and the connecting rod 75 to the lower position designated 75′. The right hand end (as shown in FIG. 1) of the connecting rod 75 is pivotally fxed as at 76 to a gear 77. The gear 77 (see also the left hand portion of FIG. 2) is in engagement with the gear 23. Thus, the previously mentioned rotational movement of the chamber 13, due to rotation of the gear 23, is achieved through a partial rotation of the gear 77. It will be appreciated that the gear 77 roates only a portion of a revolution before rotating the opposite direction, so as ultimately to return the whipping chamber 13 to the starting position for another cycle.

Discharge mechanism

Figure 6:
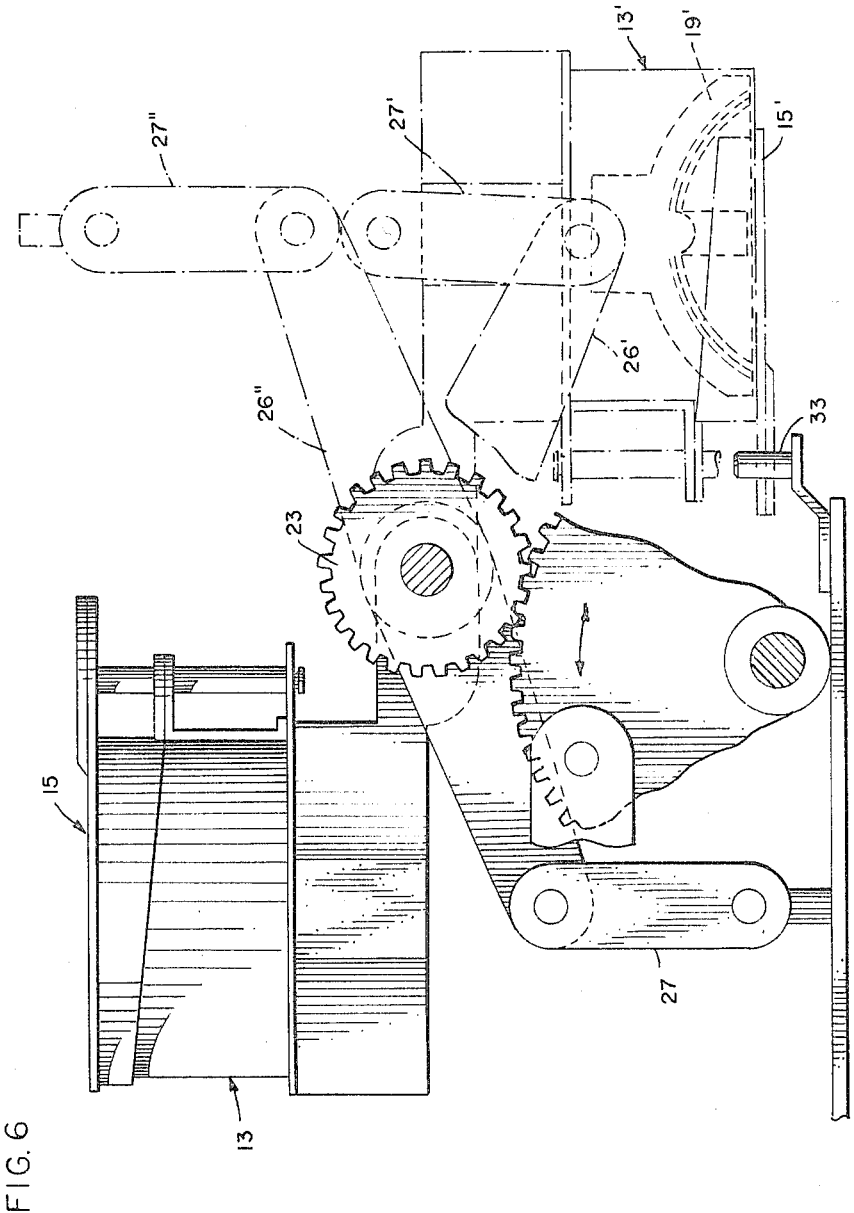
FIG. 6 is an enlarged fragmentary view of the central right hand portion of FIG. 1.

In FIG. 6, the whipping chamber 13 is displayed in solid line and is seen to be positioned above the link 27. Each link 27 and its associated line 26 has been previously described relative to FIG. 2. In the discharge position, the whipping chamber is designated 13′ and here the links 26′ and 27′ are disposed so as to position the cup-shaped base 19′ immediately adjacent the cover 15′. The intermediate position of these two links is designated 26″ and 27″. As the whipping chamber 13 has swung through a 180° arc and the lids 15′ opened by virtue of engaging the actuator post 33, the drive assembly including the gear 23 continues for an additional 45° of rotation, i.e., from the disposition of the links 26″ and 27″ to the position 26′ and 27′. This drives the cup-shaped bottom 19′ downwardly, i.e., into the whipping chamber 13. Upon reversed rotation of the gear 23, the reverse sequence is employed—the final 45° of rotary movement of the gear 23 retracts the cup-shaped bottom 19 from its extended position within the whipping chamber 13 to the condition shown in FIG. 1.

Simultaneous with the lowering of the cup-shaped bottom 19, the impeller 16 is rotated at a relatively slow speed by virtue of the quadrant gear 78 (see FIGS. 1 and 3). This is brought about by the lowering of the yoke 28. In FIG. 3, the lowered position of the yoke is designated 28′ and it is seen that the quadrant gear 65 is pivotally mounted on the yoke 28 as at 79. The quadrant gear 78 also is equipped with a pin 80 which rides in a slot 81a provided in a link 81. The lower end of the link 81 is pivotally mounted on the support 25 so that upon lowering of the yoke 28 (which causes the cup-shaped bottom 19 to enter the whipping chamber 13), the link 81 moves in an arcuate fashion to the position 81′. In so doing, it engages a spur gear 82 provided on the shaft 56. This rotates the impeller 19 in a relatively slow fashion, i.e., about one revolution during the length of travel of the yoke 28. The link 81 serves as a disengaging means on the reverse movement of the whipping chamber. As the whipping chamber, 13 is rotated back to the solid line position in FIG. 1, the disengaging link 81 limits the extent to which the quadrant gear 78 can follow the shaft 56, thereupon returning the quadrant gear 78 to the solid line position of FIG. 3. During the forward movement of the whipping chamber 13, the gear 78 is pivoted at the very last part of the discharge movement thereby causing the impeller 16 to scavenge remaining portions of whipped potato from the bottom 19. This delayed movement arises from the coaction of a camming pin 82 (see FIG. 3) with a cam surface 83 provided on the underside of the quadrant gear 65.

Specific operation including electrical sequence

Reference is now had to FIG. 9 where the numeral 84 designates a plug adapted to be coupled to a source of commercial power, i.e., 120 volts, 60 cycle alternating current. Electrical power is employed to keep water heated which is ultimately dispensed through the spout or conduit 14. The water heater 85 is seen to be in series with a thermostat switch 86 and a toggle switch 87. Initially, the toggle switch 87 is turned to "off" on the initial installation to keep the hot water heater 85 off. It is turned to "on" when the water tank is filled with water, thereby affording a protection for the water heater. When the water reaches the prescribed temperature, the thermostat switch changes to the position shown illuminating an indicator light 88 and removing electrical power from the water heater 85.

The float switch 89 is activated by a float (not shown) which detects a lowering of the water level in an associated hot water tank (also not shown). When the float switch 89 is activated, it in turn energizes an inlet water solenoid 90, supplying water to the tank until the demand is satisfied.

A first cam switch designated 91 is activated when the hopper motor M is running. The switch 91 is timed to deliver hot water to the whipping chamber 13 when the lids 15a of the whipping chamber 13 have been opened by the hopper lid opening pin 32. It will be appreciated that the cam switch 91 includes a cam 91a which is carried by the hopper motor drive shaft. The hopper motor drive shaft also carries a second cam 92a which operates a second cam switch 92 and which is operated when the hopper motor runs. Once the hopper motor M starts to run, the switch 92 is closed and completes a circuit that keeps the motor running for a complete cycle after which the switch 92 opens.

The start button S is seen to be in series with the hopper motor M and a third cam switch 92 (actuated by cam 93a). The switch 93 is activated by the Vend motor 50 and is opened when the Vend motor 50 is running. This breaks the circuit to the start button switch S, so that the new Vend cycle cannot be started when the Vend motor 50 is running. Also arranged in series with both the Vend motor and the hopper motor is a clean cycle switch designated 94. When activated manually, the switch 94 breaks the circuit to the start button and to another cam switch 95 arranged in series with the Vend motor 50. Positioning of the clean cycle switch 94 to the position alternate to that shown establishes a circuit to the Vend motor 50 to yet another cam switch 96, causing the Vend motor 50 to run until it brings the whipping chamber 13 to a horizontal position. When this position is reached, the cam 96a associated with the cam switch 96 causes the same to open, stopping the Vend motor so that the whipping chamber is accessible for cleaning. When the clean cycle switch 94 is returned to its normal or shown position, the circuit is completed through the cam switch 95 and the Vend motor 50 causing the Vend motor 50 to return the whipping chamber to the "fill" position.

Yet another cam switch 97 is activated by the hopper motor M and is timed so that when the whipping chamber 13 has been filled with ingredients and water and the lids 15a are closed, the circuit is completed to the Vend motor 50 causing it to run which in turn starts the whipping blade into motion and eventually dispenses the product. Once the Vend motor 50 starts its cycle, it will continue in its cycle, by virtue of closing the cam switch 95 via rotation of the cam 95a. When the Vend motor 50 reaches the end of its cycle, the cam switch 95 is opened.

Also shown in FIG. 9 is a heater 98 for the whipping chamber 13 equipped with reostats as at 99 for governing the amount of heat delivered to the whipping chamber.

The inventive apparatus provides an additional result in that the whipped single portion of the mashed potatoes is dispensed with a hole configuration in the center of the portion. This facilitates the addition of gravy or a butter pat, making the serving more eye-appealing.

While in the foregoing specification, a detailed description of an embodiment of the invention has been set down for the purpose of explanation, many variations of the details herein given may be made by those skilled in the art without departing from the spirit and scope of the invention.

I claim:

1. Potato whipping apparatus comprising a frame, a chamber pivotally mounted on said frame and equipped at one end with an openable lid, an impeller rotatably mounted in said chamber, and power means on said frame operably associated with said chamber and impeller for sequentially rotating said impeller with said lid closed and while said chamber is in an ingredient-receiving position, thereafter rotating said chamber to an ingredient-dispensing position and while said impeller is non-rotating, and lastly rotating said impeller with said lid being open and while said chamber is in said ingredient-dispensing position.

2. The structure of claim 1 in which said chamber at the end thereof opposite said one end is equipped with a cup-shaped bottom mounted for movement toward and away from said one end, said power means also being operably associated with said bottom to move said bottom toward said one end only when said lid is open and while said chamber is in ingredient-dispensing position.

3. The structure of claim 1 in which said power means includes a gear for rotating said impeller at a relatively slow speed while said chamber is in said ingredient-dispensing position, said power means further including a disengageable drive shaft for rotating said impeller at a relatively high speed while said chamber is in said ingredient-receiving position.

4. Potato whipping apparatus comprising a frame, a drive motor mounted on said frame, a horizontally extending shaft pivotally mounted on said frame, a whipping chamber frictionally mounted on said shaft, said chamber having a cup-shaped bottom and an openable top, a pair of posts mounted on said chamber for pivoting therewith, said bottom being slidably mounted on said posts, said bottom being centrally apertured and a shaft rotatably supported in said bottom and having an impeller fixed thereto positioned with said chamber, a gear on said shaft external of said chamber, crank means coupling said motor to said shaft, first linkage means coupling said shaft and said bottom for moving said bottom toward said top after said shaft has pivoted said chamber through about a 180° arc, second linkage means coupling said shaft and gear for rotating said gear during movement of said bottom, and means on said frame for opening said top at the end of the chamber pivotal movement.

5. A potato whipping apparatus comprising a frame, a chamber pivotally mounted on said frame and equipped at one end with an openable lid, a hopper means on said frame above said chamber one end, said hopper means being adapted to gravimetrically dispense potato flakes into said chamber, water supply means of said frame also adapted to deliver water into said chamber when the lid thereof is open, an impeller rotatably mounted in said chamber, and power means on said frame operably associated with said chamber and impeller for sequentially rotating said impeller with said lid closed and while said chamber is in an ingredient-receiving position, thereafter rotating said chamber to an ingredient-dispensing position and while said impeller is non-rotating, and lastly rotating said impeller with said lid being open and while said chamber is in said ingredient-dispensing position.

6. The structure of claim 5 in which control means for said water supply means are provided on said frame, motor means on said frame operably associated with said hopper means for activating the same into dispensing condition, said control means being responsive to said motor.

7. The structure of claim 5 in which said hopper means includes a housing rotatable about a vertical axis, second power means of said frame for rotating said housing, an opening in the bottom of said housing alignable with an opening in said frame above said chamber, and a metering plate non-rotatably mounted within said chamber positioned relative to said frame opening to restrict the height of potato flakes in said chamber above said housing opening just prior to the time said openings are in alignment whereby substantially identical volumes are sequentially dispensed.

8. The structure of claim 7 in which said frame is equipped with a circular trough disposed immediately below said housing and aligned with the rotary half of said housing opening.

9. The structure of claim 5 in which second power means are provided for actuating said hopper means in response to an initiating signal, the first mentioned power means being responsive to said second power means, and means operable by said first mentioned power means for preventing the occurrence of another initiating signal during a dispensing sequence.

10. The structure of claim 5 in which gear means are operably associated with said chamber for rotating the same about 180° for dispensing and thereafter reversely rotating said chamber to ingredient-receiving position, and switch means operably associated with said power means for halting the rotation of said means to position said chamber in ingredient-dispensing position for cleanout.

11. The structure of claim 10 in which said power means includes a Geneva drive for driving said gear means and a yoke-supported axially movable shaft for driving said impeller.

References Cited by the Examiner

UNITED STATES PATENTS

| | | | |
|---|---|---|---|
| 2,201,222 | 5/1940 | Bramson et al. | 259—43 |
| 3,215,094 | 11/1965 | Oldershaw et al. | 107—14 |

WALTER A. SCHEEL, *Primary Examiner.*

R. W. JENKINS, *Assistant Examiner.*